United States Patent [19]

Pfuhl et al.

[11] Patent Number: 4,589,713
[45] Date of Patent: May 20, 1986

[54] VIDEO DISPLAY SUPPORT JOINT

[75] Inventors: Paul H. Pfuhl, Wrentham, Mass.; Charles E. Morrison, Newbury Park; Victor D. Decker, Simi Valley, both of Calif.

[73] Assignee: Raytheon Company, Lexington, Mass.

[21] Appl. No.: 597,903

[22] Filed: Apr. 9, 1984

[51] Int. Cl.⁴ .......................................... H01R 35/04
[52] U.S. Cl. ....................................... 339/7; 248/349; 339/8 R
[58] Field of Search ................... 339/8 R, 8 P, 5 R, 7; 248/346, 349

[56] References Cited

U.S. PATENT DOCUMENTS

| | | | |
|---|---|---|---|
| 4,473,206 | 9/1984 | Stillinger | 248/346 X |
| 4,483,503 | 11/1984 | Gahan | 248/349 |
| 4,547,027 | 10/1985 | Scheibenreif | 339/8 R |

Primary Examiner—Eugene F. Desmond
Attorney, Agent, or Firm—William R. Clark; Richard M. Sharkansky

[57] ABSTRACT

A video display terminal having a quick release tilt and swivel joint for supporting the CRT unit. In a unique swivel alignment between the CRT unit and its base, the CRT unit can be coupled to or separated from the base by merely lowering or lifting the CRT unit. Swivel of the CRT unit from the initial coupling alignment causes engagement of the joint preventing separation. The electrical connections to the CRT unit pass through a self-aligning detachable electrical interface defined by two mating connectors.

19 Claims, 18 Drawing Figures

VIDEO DISPLAY SUPPORT JOINT

BACKGROUND OF THE INVENTION

Video display terminals are in wide usage for such applications as remote terminals for a host computer, a computer interface, and word processors. It may be desirable that the operator be able to tilt and swivel the CRT enclosure such that the CRT screen is more conveniently viewed. For example, if the video display is a workstation, it may be desirable to position the terminal off to the side of a desk and then swivel the CRT enclosure such that it faces the operator. Also, it may be desirable that the CRT screen be tiltable to accomodate various vertical viewing angles.

One example of a prior art adjustable mounting structure for a video display terminal is found in U.S. Pat. No. 3,970,792, issued July 20, 1976. One significant drawback of the embodiment described therein is that the workstation cannot be assembled and disassembled without the use of tools. Also, the cables running to the CRT unit are not enclosed within the housing.

In another prior art approach, tilt and swivel are provided by a recess having a vertical turret which inserts through an oblong slot in a ball segment of the CRT enclosure. A collar is then positioned on the turret and screws are tightened down to secure it thereto. In this embodiment, cables to the CRT are routed through the center of the turret. One significant drawback of this prior art device is that the initial installation is complex. More specifically, the CRT enclosure has to be disassembled so that the collar can be secured to the top of the turret after insertion through the oblong slot. Then, the cables have to be connected to the electronics within the CRT enclosure. Another drawback is that after assembly, the CRT unit cannot be removed or replaced without reversing the complicated installation procedure. Also, the assembling and disassembling procedures require tools so trained technicians may have to be dispatched. Still another drawback is that even if the collar were not present so that the CRT unit could be lifted off, the CRT unit would still be connected to its base by the interconnecting cables.

SUMMARY OF THE INVENTION

One object of the invention is to provide a joint for supporting an enclosure such as a CRT unit wherein the enclosure can be tilted and swiveled through limited arcs while at the same time, being disengageable in one predetermined swivel alignment.

Another object of the invention is that the enclosure be disengageable without the use of tools.

Still another object of the invention is that the electrical wires routed to the enclosure pass through the joint.

Still another object is that when the joint is disconnected, all mechanical and electrical connections to the enclosure be broken or separated.

It is also an object of the invention that in engaging the joint, an electrical interface between the enclosure and its base be in the proper alignment for mating.

These and other objects and advantages of the invention are provided by a joint which defines a "quick release" mechanism for mounting a CRT unit enclosure above a stable base such as an electronics unit enclosure which houses a controller. By "quick release" it is meant that the CRT unit can be mounted to or removed from the base without a time consuming or complicated procedure and preferably without the use of tools. Such a mechanism has particular advantage in that a new video display terminal can be readily assembled by customers in the field without the need for dispatching trained technicians. Also, in accordance with the teaching of the invention, the joint provides for limited swivel such as, for example, 340° so that the CRT screen 18 can be adjusted to face the operator. "Swivel" is meant to define rotation of the CRT unit in a horizontal plane about the base. Also, the joint provides for limited tilt such as, for example, 10° fore and 20° aft so that the CRT screen can be adjusted up or down for convenient viewing. "Tilt" is meant to define rotation of the CRT unit in a vertical plane about the base. Further, the joint defines a separate self-aligning electrical interface. More specifically, the electrical wires that are routed to the CRT pass through joint 25 rather than having an external cable between the CRT unit and the electronics unit. The electrical interface which is defined by matable connectors is not only separable for disassembly of the joint but, its alignment for connecting is provided by the joint. The joint can be assembled and disassembled in only one predetermined swivel alignment between the CRT unit and the electronics unit.

More specifically, the invention defines a video terminal comprising an electronics unit having a top cover with a recess defining a spherically congruent seat, a CRT unit having an enclosure with a spherical segment protruding downwardly for resting on the seat to provide support for the CRT unit, and means for engaging the CRT unit to the electronics unit to prevent separation, the engaging means providing limited horizontal rotation of the spherical segment on the seat for swiveling the CRT unit, the engaging means providing limited vertical rotation of the spherical segment on the seat for tilting the CRT unit, the engaging means permitting separation of the CRT unit from the electronics unit by lifting the CRT unit upward in one unique horizontal rotational relationship of the CRT unit to the electronics unit. For example, the seat may define an annular band having an annular trough inward therefrom and a boss protruding from the spherical segment which projects into the annular trough wherein horizontal rotation is limited by the boss contacting a stop in the trough.

The invention may also be practiced by a disengageable joint between a stable base and a supported member providing limited movement of the supported member in two orthogonal planes, comprising a concave recess in the stable base which defines a bearing surface for a sphere, a cylindrical turret protruding from a bottom central region of the recess and rigidly attached thereto, the supported member having a downward protruding spherical segment adapted for seating on the bearing surface, the spherical segment having an oblong slot for receiving the turret during engagement of the joint wherein tilt and swivel of the supported member about the turret are provided, and means mounted within the sperical segment for engaging the turret to prevent separation of the supported member from the stable base except in a predetermined swivel alignment between the supported member and the stable base wherein the supported member can be raised and lowered for disengaging and engaging the joint.

The invention also defines a disengageable joint providing limited tilt and swivel of a CRT enclosure about a stable base on which it is supported, comprising a concave upward facing recess in the base, the recess having a circular perimeter and defining a spherically congruent annular seat and an annular trough having a stop therein, the recess having a cylindrical turret extending vertically upward from the bottom center of the trough, the turret having a plurality of at least two pairs of opposing horizontal lugs extending therefrom, the CRT enclosure having a ball segment protruding from the underside thereof, the ball segment being adapted for resting on the annular seat, the ball segment having an oblong slot for receiving the turret during engagement of the joint, the slot having a width large enough for insertion over the lugs in a predetermined swivel alignment of the CRT enclosure to the turret wherein, after insertion, the CRT enclosure can be swiveled about the turret, the ball segment having a boss protruding into the trough to limit swivel in both directions by the boss contacting the stop, the CRT unit being tiltable by movement of the slot in the lengthwise direction about the turret and means mounted within the ball segment for engaging the lugs except in the predetermined swivel alignment wherein, in that alignment, the joint is engageable and disengageable and in all other alignments, the joint is nonengageable and if already engaged, the CRT unit is inseparable from the stable base. It may be preferable that there be six lugs and at least two have different arcuate lengths. Furthermore, the engaging means may comprise two parallel arcuate flanges projecting beneath lugs in all except the predetermined alignment of swivel.

The invention may also be practiced by a disengageable joint for supporting an enclosure while providing limited movement of the enclosure in two orthogonal planes such as horizontal and vertical about a stable base, comprising a concave recess in the stable base, the recess defining a bearing surface for a sphere, a cylindrical turret protruding upwards from a central region of the recess, the enclosure having a downward extending spherical segment adapted for seating on the bearing surface, the spherical segment having an oblong slot for receiving the turret thereby providing movement of the spherical segment in two orthogonal planes, a first electrical connector mounted within the turret, a second electrical connector mounted within the spherical segment, the second electrical connector being adapted for mating with the first electrical connector in a predetermined alignment, and means for providing alignment of said first and second electrical connectors in said predetermined alignment when said slot is inserted down over said turret.

The invention further defines a disengageable joint for supporting an enclosure and providing tilt and swivel about a stable base, comprising a concave recess in the stable base, the recess having a substantially circular entrance and defining a spherically congruent annular seat, the recess having a cylindrical turret protruding from the bottom central region thereof, the turret having a plurality of upwardly extending fingers with lugs perpendicular thereto, the enclosure having a downward extending ball segment adapted for resting on the annular seat, the ball segment having an oblong slot adapted for receiving the turret during engagement of the joint thereby providing tilt of the enclosure by movement of the slot in a lengthwise direction with respect to the turret which is stationary and swivel of the enclosure by rotation of the slot about the turret, a first electrical connector rigidly mounted within the turret and facing upwards, a second electrical connector mounted inside the ball segment and facing downward, the second electrical connector being adapted for mating with the first electrical connector in a predetermined rotational alignment, means for preventing the turret from being inserted through the slot for engagement of the joint unless the enclosure is rotationally positioned above the turret such that said second connector is in the predetermined rotational alignment with the first connector, and means connected within the ball segment for engaging the lugs of the fingers when the enclosure is rotated from the engagement position, the engagement means preventing disengagement of the joint except in said engagement position.

BRIEF DESCRIPTION OF THE DRAWINGS

The foregoing objects and advantages of the invention will be more fully understood by reading the Description of the Preferred Embodiment with reference to the drawings wherein.

DESCRIPTION OF THE PREFERRED EMBODIMENT

Figure 1:
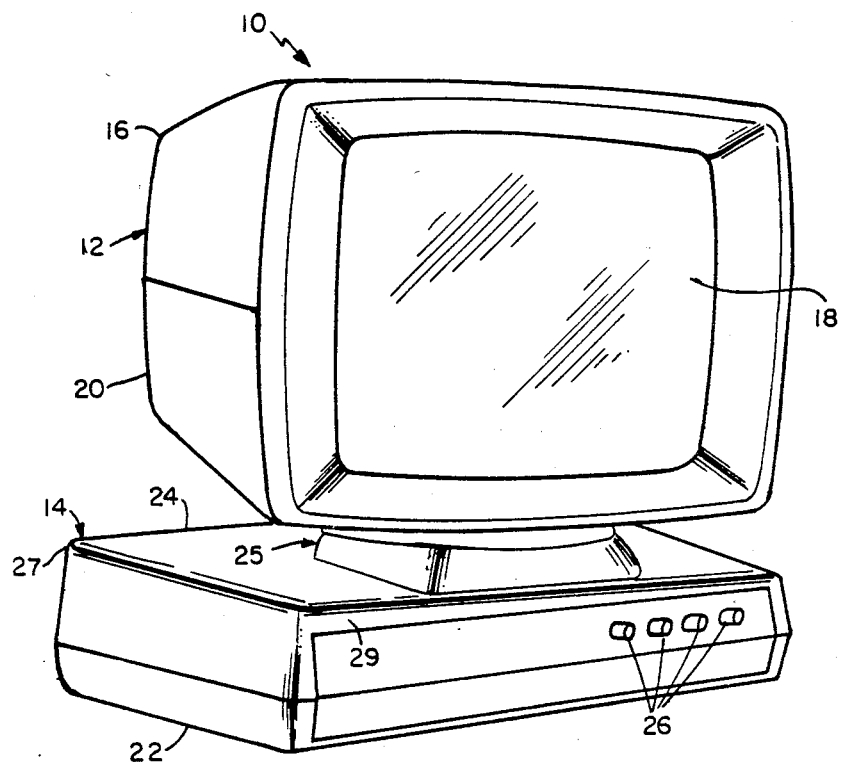
FIG. 1 is a perspective view of a video display terminal.

Referring to FIG. 1, a perspective view of a video display terminal 10 including a CRT unit 12 and electronics unit 14 is shown. The CRT screen 18 is visible at the front of the CRT unit enclosure 16. Typically, CRT unit enclosure 16 comprises an assembly of parts which are connected together by suitable means such as screws. One of these CRT unit enclosure parts is bottom casing 20. Electronics unit 14 also has an enclosure 22 which also conventionally comprises an assembly of parts of which one is top cover 24. In accordance with the invention, there is a joint 25 between CRT unit 12 and electronics unit 14 which houses the electrical connections between the two, permits the CRT 12 unit to be moved independently in the horizontal and vertical axes about the stable base of electronics unit 14 to provide convenient viewing of the CRT screen 18, and also is readily disengageable to provide removal of CRT unit 12. The internal electronic components of video display terminal 10 are outside the scope of this invention and may use conventional suitable electronics equipment. For example, in one application, a plurality of video display terminals 10 such as used in airline reservation systems may be connected to a host computer (not shown). In such application, electronics unit 14 may consist of electronics logic which functions as a controller for CRT unit 12. Conventionally, a keyboard (not shown) would be connected to each electronic unit 14 whereby the operator of the video display terminal 10 or workstation inputs data to the host computer. Also, electronics unit 14 may have CRT controls 26 for various operational functions such as, for example, controlling brightness or on/off. In another exemplary application, video display terminal 10 along with peripheral equipment can be designed to be a self-contained electronic system functioning, for example, as a computer or word processor. Further, those skilled in the art will recognize that the mechanical inventive principles described later herein could have application to systems other than video displays. For example, joint 25 could be used to mount an enclosure housing an electronics control panel instead of CRT unit 12. Also, instead of electronics unit 14, a base or stand not associated with electronics could be used.

Figure 2:
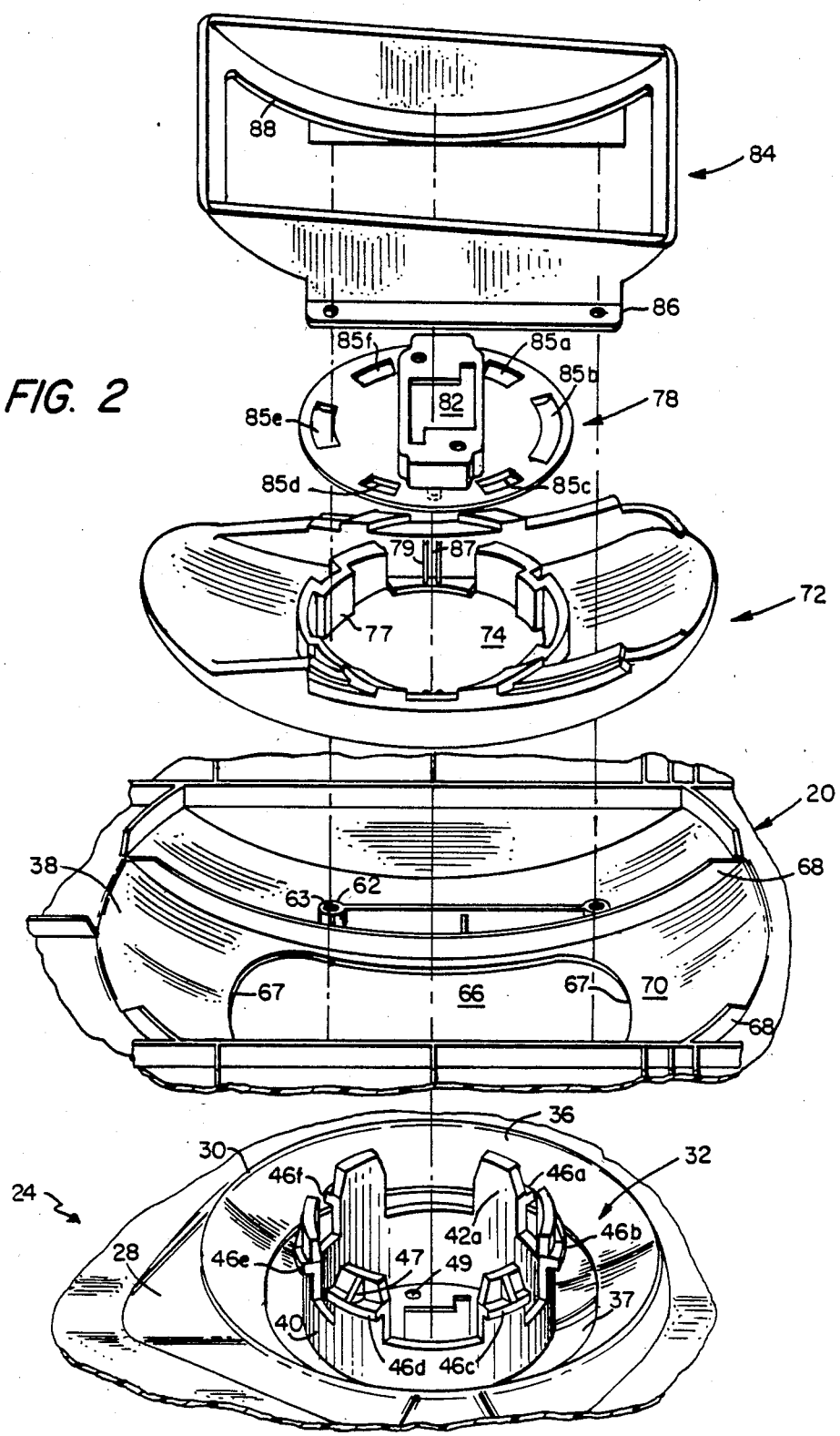
FIG. 2 is an exploded view of the parts forming the joint supporting the CRT unit of FIG. 1.
Figure 17:
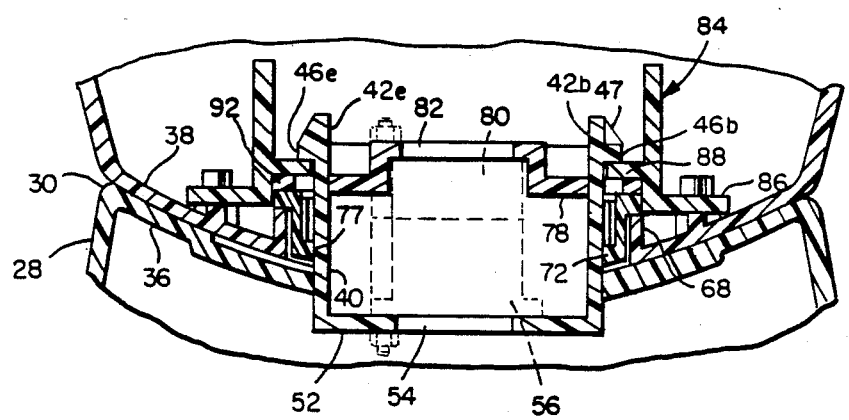
FIG. 17 is a view taken along line 17—17 of FIG. 16.

Referring to FIG. 2, an exploded perspective view of the injection molded plastic parts used to form joint 25 between CRT unit 12 and electronics unit 14 is shown. Each of the parts will be described in detail with reference to their individual drawings. Briefly, the base of joint 25 is electronics unit 14 or more particularly, top cover 24. The ball segment 38 of the bottom casing 20 of CRT unit enclosure 16 seats in recess 32, at least a part of which is complementary or congruent thereto. Protector cover 72 is supported in channel 70 and is free to slide in a lengthwise direction between guide rails 68. Connector ring 78 or mounting plate is supported by protector cover 72. Although connector ring 78 can rotate on protector cover 72 so that mating connectors 56 and 80 as shown in FIG. 17 are held in fixed alignment to each other and to stationary turret 40 during rotation or swivel of CRT unit 12, rotation of connector ring 78 with respect to protector cover 72 is discouraged when joint 25 between CRT unit 12 and electronics unit 14 is separated or decoupled. Retainer 84 is mounted to bottom casing 20 and captivates protector cover 72 and connector ring 78 within channel 70. Also, flanges 88 of retainer 84 engage the undersides of lugs 46a-f to secure or couple joint 25 making it inseparable except in a unique swivel alignment when the joint can be decoupled.

Figure 3:
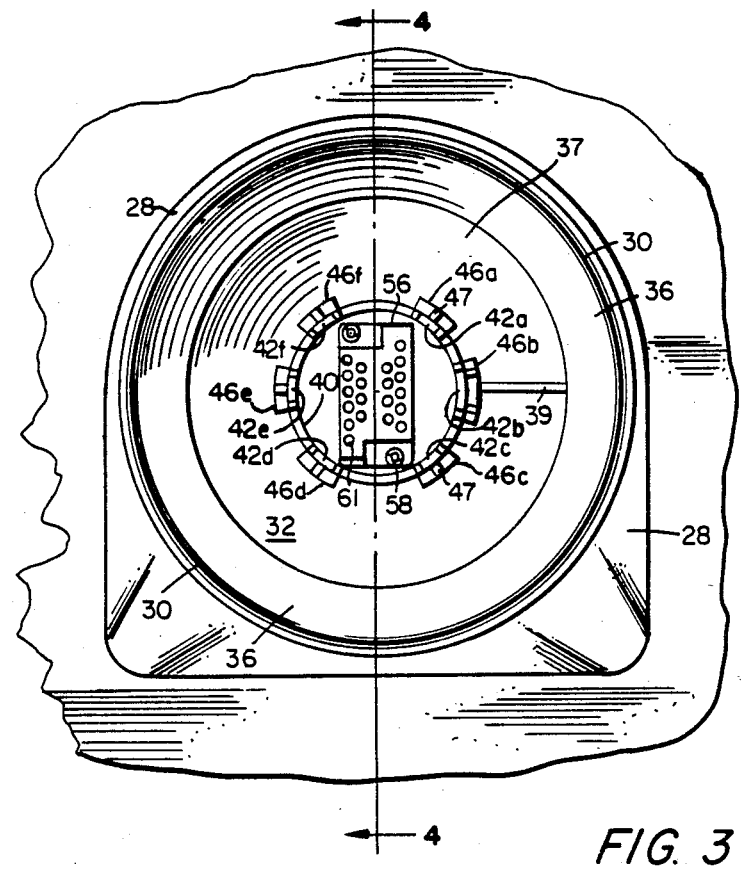
FIG. 3 is a top view of the joint portion of the top cover of the electronics unit.
Figure 4:
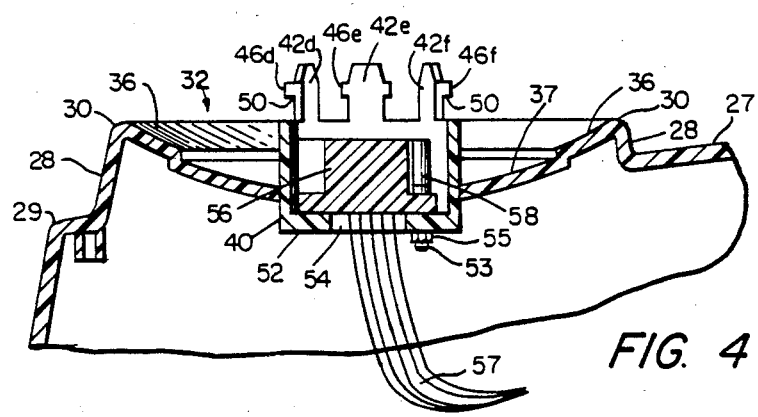
FIG. 4 is a view taken along line 4—4 of FIG. 3.

Referring to FIGS. 3 and 4, there are respectively shown a top view of the joint portion of top cover 24 and a view taken along line 4—4 of FIG. 3. Electronics unit 14 is preferably positioned on a table or desk (not shown) and provides a stable base for supporting CRT unit 12 which can be rotated or swiveled in a horizontal plane through a limited arc, such as 340°, and tilted in a vertical plane through a limited arc such as 10° fore and 20° aft to provide convenient viewing of CRT screen 18. Top cover 24 of electronics unit enclosure 22, here shown with a downward slope from back 27 to front 29, has a raised mound 28 defining a horizontal circular ridge 30 surrounding a concave recess 32. At least a portion of recess 32 defines a surface that is spherically congruent or complementary with spherically shaped ball segment 38 of bottom casing 20 so that regardless of the limited tilt and swivel position of CRT unit 12, stable support is provided. More specifically, annular seat 36 or band has a curvature conforming to ball segment 38 thereby providing a bearing surface for joint 25. In an illustrative embodiment, ridge 30 has a diameter of approximately 7 inches and the imaginary sphere defined by annular seat 36 or ball segment 38 has a substantially larger diameter such as, for example, 15 inches. The width of annular seat 36 may be less than an inch; this relatively small dimension allows the fabrication tolerances of seat 36 to be loosened without concern for CRT unit 12 being wobbly. Annular trough 37 on the inside of seat 36 has a radial rib 39 which defines a stop to limit swivel.

Cylindrical turret 40 extends vertically upward from the center of recess 32 at the inward side of trough 37. Six fingers 42a-f rise vertically upward from the circumference of turret 40. Each finger 42a-f has an outwardly extending lug 46a-f, the purpose of which will be described later herein. For structural strength, fingers 42a-f extend up beyond lugs 46a-f respectively and have braces 47. The ends of fingers 42a-f are tapered to simplify the engagement of CRT unit 12 on electronics unit 14 as will be described later herein. The planar undersides 50 of lugs 46a and c-f are all at the same vertical height and lug 46b is slightly higher. Referring specifically to FIG. 3 for an illustrative example, lugs 46a and 46c-f each have an arc of approximately 25° while lug 46b has a larger arc, here 38°. For reasons that will be understood later, lugs 46a-f are not equally spaced around the circumference of turret 40, here having a diameter of approximately 2.75 inches. More specifically, the centers of fingers 42f and 42a are spaced approximately 76° apart as are the centers of fingers 42d and 42c. In contrast, the respective centers between all other adjacent fingers are spaced approximately 52°. Accordingly, if parallel straight locking tracks or flanges 88 are spaced just enough so as to fit down over turret 40 and the lugs when the tracks are respectively adjacent to lugs 46a,f and lugs 46c,d, then the tracks will not fit over turret 40 in any other rotational alignment. More specifically, when one track is peripherally adjacent to lugs 46f and 46a and the opposite track is peripherally adjacent to lugs 46d and 46c, they are spaced approximately 3 inches and this distance is less than if the tracks were rotated to span the lugs in any other swivel alignment.

Integrally molded as part of turret 40 is bottom plate 52 which has a suitable aperture 54 for mounting electrical connector 56. More specifically, an electrical connector 56 such as a 25-pin Amp Connector Model No. 211150-1, which is attached to a conventional cable harness 57, is inserted in aperture 54 and mounted there using suitable means. It is preferable that connector 56 be mounted using a pair of ground receptacles 58 or jacks which have threaded necks 53 that are inserted through small circular holes 49 in bottom plate 52 for tightening down nuts 55 thereon. Although different types of electrical connectors could be used, it is important that, in conventional manner, they provide enough pins 61 for the electrical interconnections between CRT unit 12 and electronics unit 14. Further, it is important that the rotational or swivel alignment of connector 56 be rigidly secured to top cover 24.

Figure 5:
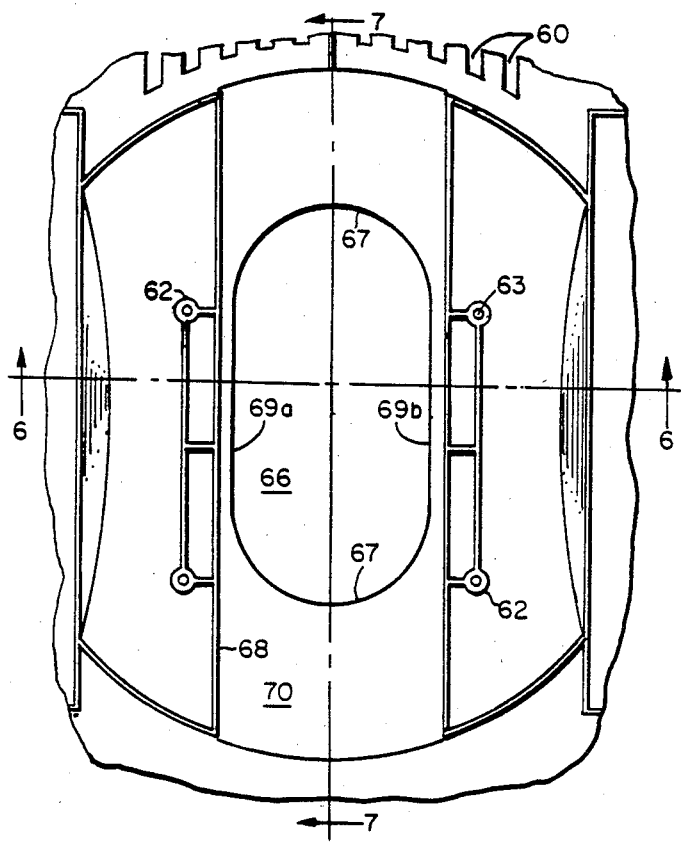
FIG. 5 is a top view of the joint region of the bottom casing of the CRT unit.
Figure 6:
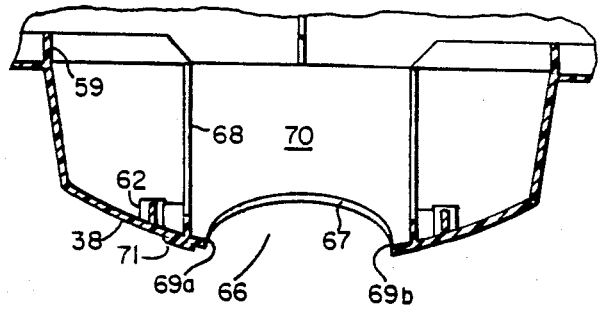
FIG. 6 is a view taken along line 6—6 of FIG. 5.
Figure 7:
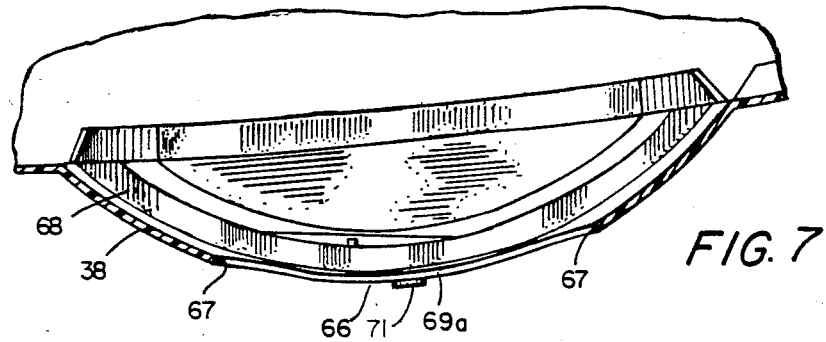
FIG. 7 is a view taken along line 7—7 of FIG. 5.
Figure 8:
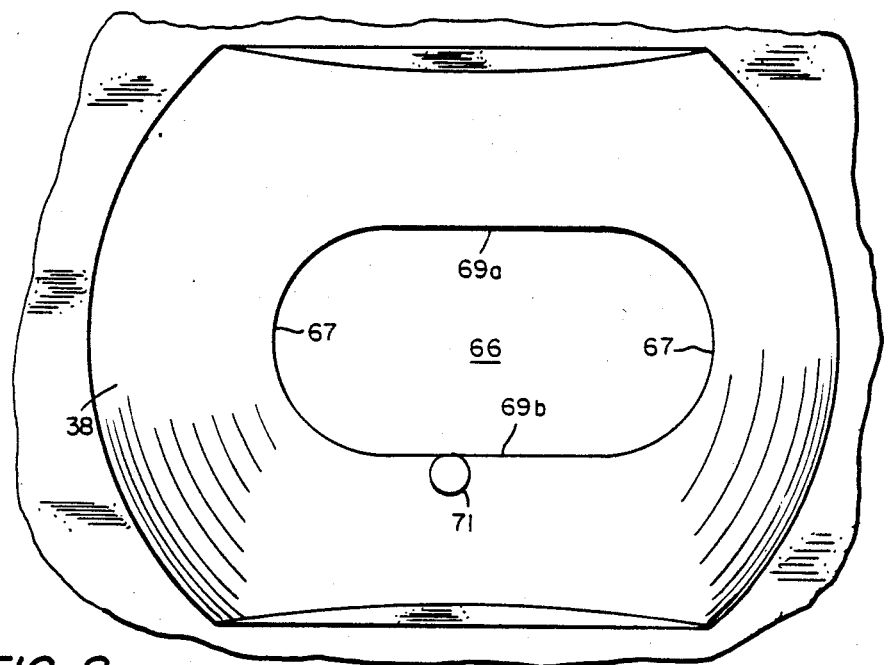
FIG. 8 is a bottom view of the joint region of the bottom casing of the CRT unit.

Referring to FIGS. 5 and 8, there are respectively shown top and bottom views of the joint region of bottom casing 20. FIGS. 6 and 7 are respective views taken along lines 6—6 and 7—7 of FIG. 5. For structural strength, the inside of bottom casing 20 has internal ribs 59. Also, holes 60 are provided in bottom casing 20 for ventilation. Bosses 62 with threaded inserts 63 are provided for assembling joint 25 as will be described later herein. Ball segment 38 protrudes from the underside of bottom casing 20 and defines a spherically shaped bearing surface for supporting CRT unit 12 on annular seat 36 of electronics unit 14. The diameter of an imaginary sphere defined by ball segment 38 is approximately the same size as the imaginary sphere defined by annular seat 36. The sides of ball segment 38 are truncated but this never reduces the surface contact area with annular seat 36 because the truncated sections are outside ridge 30 and run in the fore/aft direction which is the only way that CRT unit 12 can be tilted. Stationary turret 40 inserts through oblong slot 66 which extends from front to back in the underside of ball segment 38. The length of slot 66, here slightly more than 6 inches, is sufficient to provide the desired fore and aft tilt about turret 40. In fact, the ends 67 of slot 66 provide the stops for tilting and therefore should be carefully selected to limit the allowable tilt as desired. The width of slot 66, here approximately 3 inches is sufficient to insert over turret 40 and its lugs 46a-f in at least one predetermined swivel alignment between the two. Here, that predetermined swivel alignment is when CRT unit 12 is 90° clockwise from the front 29 of electronics unit 14 such that side 69a is adjacent the outer extremities of lugs 46f and 46a on one side of turret 40 and side 69b is adjacent lugs 46d and 46c on the other side. Further, it may also be important that CRT unit 12 be insertable over turret 40 only when the two are in a predetermined swivel alignment with respect to each other. Accordingly, it may also be preferable that slot 66 be small enough so that it will only insert over lugs 46a-f of turret 40 when CRT unit 12 is rotated 90° from front. As will be apparent later herein, however, this object of limiting the engagement of joint 25 to a particular predetermined swivel alignment may be provided by other parts such as protector cover 72, connector ring 78, and flanges 88. Parallel guide rails 68 on the inside of ball segment 38 straddle oblong slot 66 and define channel 70, the purpose of which will become apparent later herein. Circular boss 71, here having a diameter of 0.5 inches and height of 0.08 inches, protrudes from the underside of ball segment 38 adjacent slot 66. When ball segment 38 rests on annular seat 36, circular boss 71 extends into trough 37 thereby not interfering with the swiveling or tilting of CRT unit 12 unless CRT unit 12 is rotated to its stop or limiting positions. More specifically, if CRT unit 12 is swiveled either 170° clockwise or 170° counterclockwise from front, circular boss 71 contacts stop 39 and further rotation is prevented. This is important to prevent complete rotation of CRT unit 12 about electronics unit 14 because such could cause excessive twisting and damage of the cable harness attached to electrical connector 80.

Figure 9:
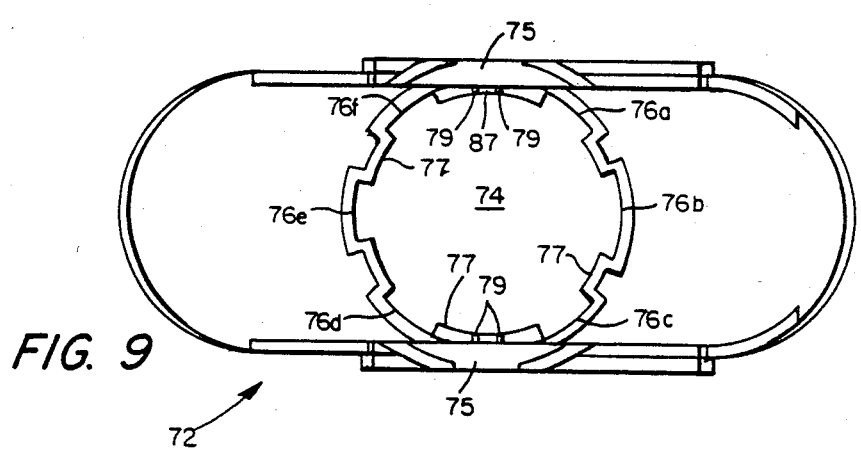
FIG. 9 is a top view of the protector cover.
Figure 10:
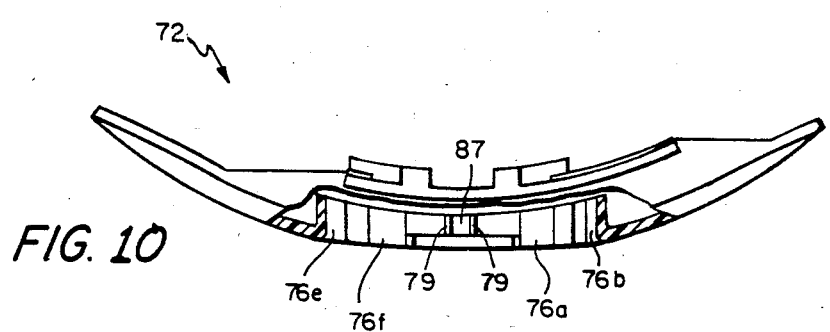
FIG. 10 is a partially sectioned side view of the protector cover.

Referring to FIGS. 9 and 10, there are respectively shown top and partially sectioned side views of protector cover 72. The underside of protector cover 72 is spherically shaped so that it is congruent or complementary to channel 70 where it is positioned. The width of protector cover 72, here approximately 3.25 inches, is slightly less than the width of channel 70. Protector cover 72 has an aperture 74 through which turret 40 inserts. The shape of aperture 74 conforms to the horizontal outline of lugs 46a-f. More specifically, the perimeter of aperture 74 has six indentations 76a-f of which indentation 76b is larger than the others so as to be keyed or insertable over lug 46b of turret 40. As a result, protector cover 72 is insertable over and separable from turret 40 only when the two are in a predetermined rotational swivel alignment such that indentation 76b aligns with lug 46b. Protector cover 72 is not free to rotate within segment ball 38 because it sits in channel 70 between guide rails 68. Because lug 46b of turret 40 is stationary at 90° counterclockwise from front and indentation 76b is fixed by guide rails 68 at the back of CRT unit 12, joint 25 is only engageable and disengageable when CRT unit 12 is in a swivel alignment that is 90° clockwise from the front of electronics unit 14. In other words, the act of assembling or disassembling joint 25 can only be accomplished when CRT unit 12 faces to the left. If disassembly or decoupling is attempted in any other swivel alignment, lug 46b being larger than the other lugs can not pass through the other indentations 76a and 76c-f. After protector cover 72 is lowered down over lugs 46a-f, the inner perimeter edges 77 of aperture 74 continue to circumscribe the cylinder of turret 40. Accordingly, even though CRT unit 12 can be tilted either forward or backward, protector cover 72 remains stationary over turret 40 as protector cover 72 moves in sliding lengthwise contact within channel 70. As a result, protector cover 72 covers the portion of slot 66 that is not filled by turret 40. This prevents foreign objects such as operator fingers from being inserted up through the spacing between turret 40 and the ends 67 of slot 66. Further, protector cover 72 has shoulders 75 on which connector ring 78 rests. Protector cover 72 also has ribs 79 adjacent aperture 74. As will be described in more detail later herein, ribs 79 provide a captive mounting for connector ring 78 to ensure proper alignment of connector 80 to connector 56 for engagement of CRT unit 12 to electronics unit 14.

Figure 11:
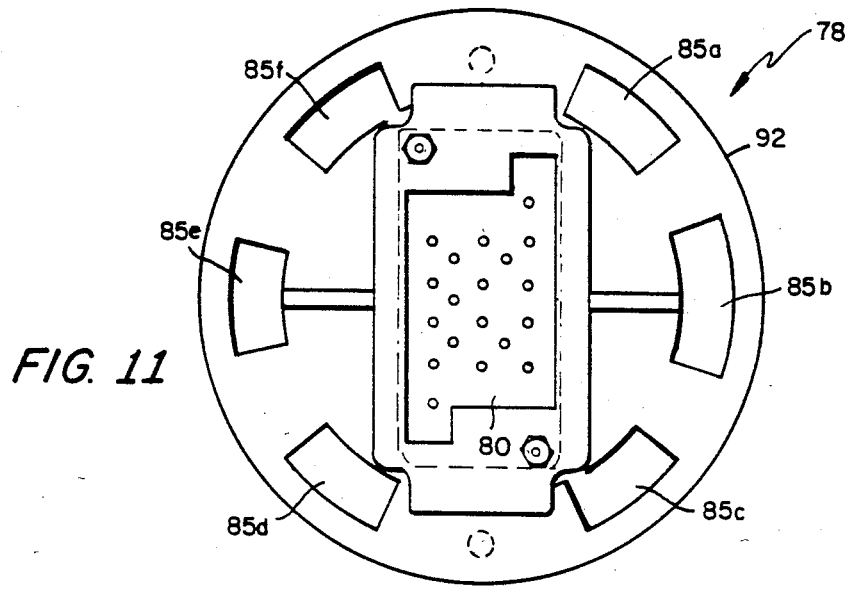
FIG. 11 is a top view of the connector ring.
Figure 12:
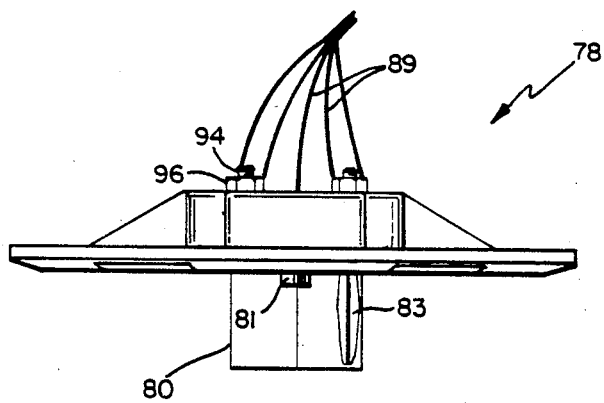
FIG. 12 is a side elevation view of the connector ring.

Referring to FIGS. 11 and 12, there are shown top and side elevation views of connector ring 78 which provides a mounting plate for connector 80 which mates with connector 56 when joint 25 is assembled or coupled. In FIG. 11, cable assembly 89 is not shown. For the example given for connector 56, the other half of the mating connector is an Amp Part No. 211149-1 which would be mounted through aperture 82 of connector ring 78 and connected by suitable means, here a pair of grounded plugs 83 that mate with ground jacks 58 when joint 25 is assembled, ground plugs 83 like ground receptacles 58 having threaded heads 94 that extend through small holes 98 in connector ring 78 for securing by tightening down nuts 96 thereon. The shape of aperture 82 like aperture 54 is suitable for inserting the cable assembly 89 of connector 80 therethrough during assembly. Circumferential openings 85a-f are keyed to fingers 42a-f and lugs 46a-f. More specifically, opening 85b is larger than the other openings and therefore it keys to lug 46b when connector ring 78 is inserted down over turret 40. Unlike protector cover 72, connector ring 78 has individual openings instead of indentations from an aperture such that after connector ring 78 is inserted down over lugs 46a-f, it is restrained from rotating by fingers 42a-f and therefore remains in fixed swivel alignment with turret 40 and more particularly to connector 56 which is mounted on plate 52. Accordingly, connector ring 78 interlocks with turret 40 to provide positive alignment between mating connector halves 56 and 80 whereby the joint between CRT unit 12 and electronics unit 14 can only be assembled when the connectors are properly aligned for mating according to well-known practice. After joint 25 is assembled, connector ring 78 remains in alignment with turret 40 and bottom plate 52 and accordingly, no rotational stress is placed on the mated connectors 56 and 80. Although protector cover 72 rotates with respect to connector ring 78 when joint 25 is assembled and CRT unit 12 is swiveled, when CRT unit 12 is positioned 90° clockwise from front so that CRT unit 12 can be disengaged or decoupled, detent 81 seats in notch 87 defined by ribs 79 so that connector ring 78 is discouraged from rotating with respect to protector cover 72 when CRT unit 12 is separated from electronics unit 14. Accordingly, connector ring 78 is encouraged to remain in fixed swivel alignment with respect to CRT unit 12 so that when CRT unit 12 is positioned in the reengagement or recoupling alignment which is 90° clockwise from the front of electronics unit 14, connectors 56 and 80 are also in the proper mating alignment.

Figure 13:
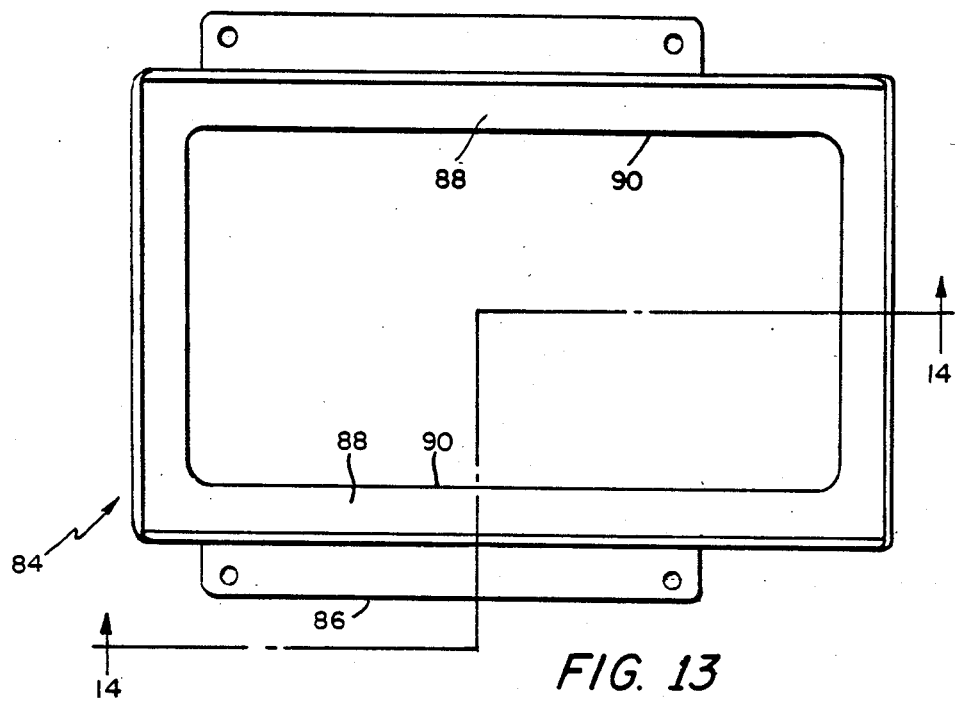
FIG. 13 is a top view of the retainer.
Figure 14:
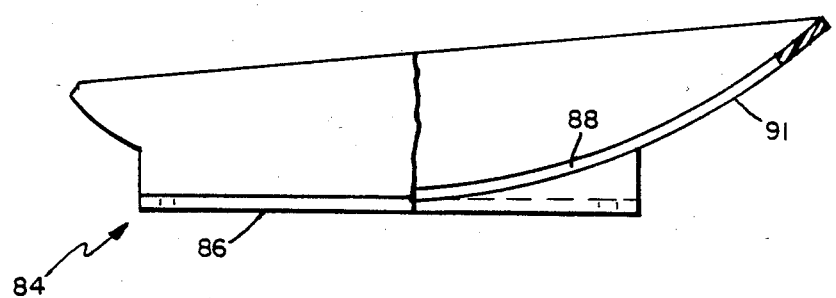
FIG. 14 is a view taken along line 14—14 of FIG. 13.

Referring to FIG. 13, a top view of retainer 84 is shown. FIG. 14 is a view taken along line 14—14 of FIG. 13. Retainer has a rectangular outside planar frame 86 which connects to bottom casing 20 by suitable means such as four screws near the respective corners of frame 86 into respective screw holes 63 of platforms 62. Retainer 84 captivates protector cover 72 and connector ring 78 within channel 70 of the bottom casing 20 of CRT unit 12. More specifically, retainer 84 has two parallel arcuate flanges 88 or locking runners which approximately conform to an arc defined by the radial distance from the tilting axis of CRT unit 12 to the underside of lugs 46a-f. The inward edges 90 of flanges 88 are spaced a distance such that they can be only inserted down over lugs 46a-f when CRT unit 12 is in swivel alignment 90° from the front of electronics unit 14. Then, when CRT unit 12 is swiveled to any other rotational position except for 180° therefrom, flanges 88 engage the undersides 50 of at least two opposing lugs 46a-f so that CRT unit is securely engaged to or inseparable from electronics unit 14. The bottoms 91 of flanges 88 seat against the top of connector ring 78 to provide a snug fit that captivates protector cover 72 and connector ring 78 in place. The arc of flanges 88 provides that even though the CRT unit 12 and accordingly retainer 84 and flanges 88 are tilted, the sections of flanges 88 disposed between stable lugs 46a-f and stable connector ring 78 are substantially horizontal. From the plane defined by frame 86, flanges 88 extend in an arc further in one direction than the other. Accordingly, CRT unit 12 can be tilted aft through a greater arc such as, for example, 20°, than fore such as, for example, 10°. As described above, retainer 84 engages the undersides of lugs 46a-f in all but two swivel positions 180° apart such that vertical movement of CRT unit 12 with respect to electronics unit 14 is prevented. In a swivel position 90° clockwise from front, CRT unit 12 can be lifted upwards decoupling it from electronics unit 14. When CRT unit 12 is 180° from that initial coupling position and more specifically at 90° counterclockwise from front, decoupling of CRT unit 12 is prevented by a mechanism other than flanges 88 being engaged underneath lugs 46a-f. More specifically, because protector cover 72 also rotated 180° from the initial engagement position, indentation 76e is directly underneath lug 46b. Accordingly, the small indentation is not keyed to the large lug and removal is prevented. Accordingly, because the engagement and disengagement of CRT unit 12 can only be accomplished in one swivel relationship or alignment of CRT unit 12 and electronics unit 14, the alignment of mating connector halves 56 and 80 is ensured.

In assembling CRT unit 12, conventional cable assembly 89 wired to connector 80 is inserted through aperture 82 of connector ring 78 from the underside and then the threaded heads of ground plugs 83 are inserted through mounting holes in connector 80 and connector ring 78 for tightening down nuts to secure the two parts together. Next, protector cover 72 is seated in channel 70 with indentation 76b towards the back. Then, connector ring 78 with connector 80 attached thereto is seated on protector cover 72 so that detents 81 rest in notches 87 defined by ribs 79 and opening 85b is above indentation 76b. Finally, rectangular outside planar frame 86 of retainer 84 is positioned on platforms 62 with the longer arc of flange 88 to the back of bottom casing 20. Screws are then used to secure the corners of frame 86 into threaded inserts 63 of respective bosses 62 and the protector cover 72 and connector ring 78 are captivated in channel 70 by the undersides of flanges 88. The rest of CRT unit 12 including enclosure 16 is assembled in conventional manner.

In assembling electronics unit 14, conventional cable harness 57 wired to connector 56 is inserted through aperture 54 of bottom plate 52 from the top side. The threaded heads of ground jacks 58 are inserted through mounting holes in connector 56 and bottom plate 52 where nuts are tightened down to secure the connector. The rest of electronics unit 14 including enclosure 22 is assembled in conventional manner.

Figure 15:
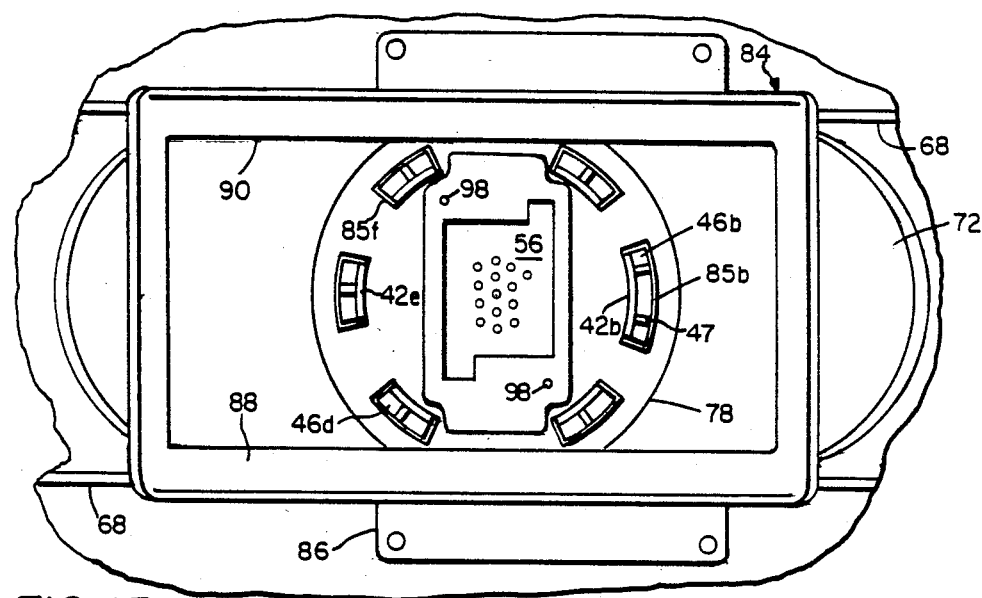
FIG. 15 is a top view of the joint in its initial coupling alignment.

Referring to FIG. 15, there is shown a top view of the parts of FIG. 2 in their initial position for forming joint 25; for illustration, connector 80 is not shown. CRT unit 12 is held above and 90° clockwise from front 29 of electronics unit 14 with aperture 74 directly above turret 40. CRT unit 12 is then lowered and lugs 46a-f insert through slot 66, indentations 76a of aperture 74, openings 85a-f and up between parallel flanges 88. As discussed earlier, indentations 76a-f and openings 85a-f conform and index to the circumferential positions and arc sizes of fingers 42a-f and lugs 46a-f. Also, the circumferential positioning of fingers 42a-f about turret 40 is such that this described swivel alignment and 180° therefrom are the only two positions where parallel flanges 88 can span over lugs 46a-f. CRT unit 12 cannot be lowered down over turret 40 in the position 180° from the initial coupling alignment because indentation 74e and opening 85e would line up with the large finger 42b and lug 46b. When ball segment 38 rests on annular seat 36, connector 80 is mated with connector 56 in conventional manner. Also, ground plugs 83 are mated with ground jacks 58.

Figure 16:
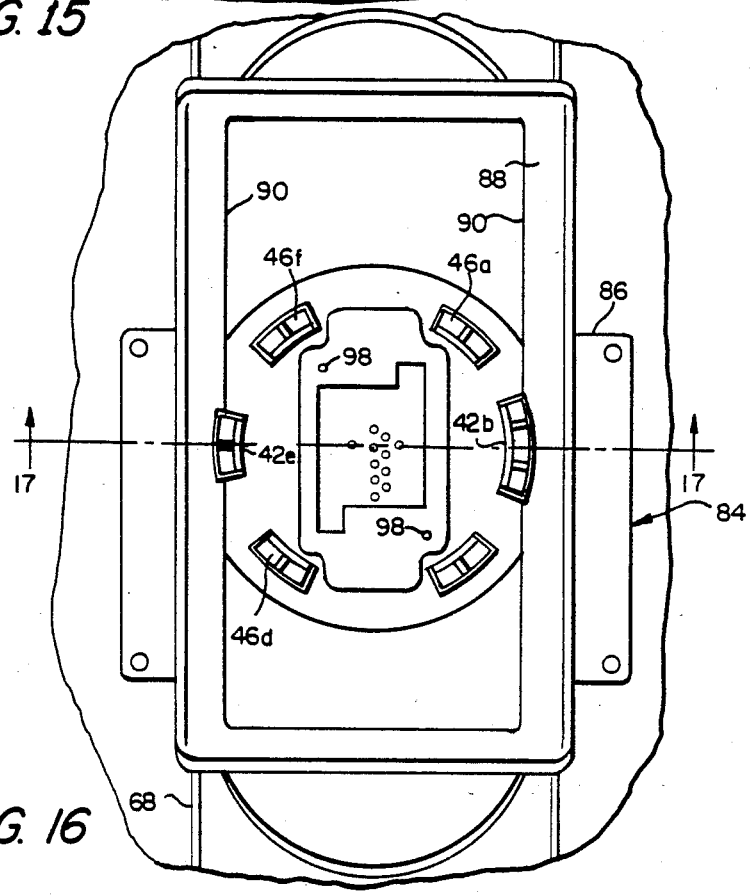
FIG. 16 is a top view of the joint after engagement.

When CRT unit 12 is rotated from the initial joint 25 assembling position of 90° clockwise from front, flanges 88 engage the underside of at least two opposing lugs as shown in FIG. 16. Accordingly, joint 25 is secure and CRT unit 12 cannot be disengaged or separated from electronics unit 14. As described earlier, if CRT unit 12 is rotated 180° from the initial assembling position or, more specifically, 90° counterclockwise from front, flanges 88 do not engage lugs 46a-f but then, bottom casing 20 cannot be raised because the key of aperture 74 does not index with the key of lugs 46a-f.

Referring to FIG. 17, there is shown a front sectional view of joint 25 taken along line 17—17 of FIG. 16. Connector 56 extends upwardly from aperture 54 in bottom plate 52 and mates with connector 80 extending downwardly from aperture 82 of connector ring 78. As shown, ball segment 38 rests on annular seat 36. Protector cover 72 is positioned in channel 70 and both sides are engaged by guide rails 68 permitting slidable movement for tilting only in the direction of guide rails 68. The inner perimeter edges 77 of protector cover 72 abut the cylinder of turret 40 below lugs 46a-f permitting swivel of CRT unit 12 about turret 40. The peripheral region 92 of connector ring 78 rests on protector cover 72 and flanges 88 of retainer 84 protrude between lugs 46a-f and peripheral region 92 of connector ring 78. The engagement of flanges 88 to the underside 50 of lugs 46a-f prevent separation of CRT unit 12 from electronics unit 14 in this depicted swivel alignment.

Figure 18:
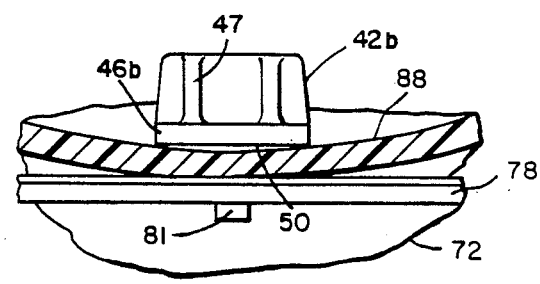
FIG. 18 is a view of flange 88 engaging a lug.

Referring to FIG. 18, there is shown a segmented side elevational view of flange 88 or locking track engaging the underside 50 of lug 46b thereby preventing the separation of CRT unit 12 from electronics unit 14. As CRT unit 12 is tilted, flange 88 moves along its defined arc wherein a different portion of flange 88 contacts the underside 50 of lug 46b. The arc to the rear of lug 46b when CRT unit 12 is level is greater than the arc to the front. Accordingly, the limit on aft arc is larger than fore such as, for example 20° as compared with 10°. As stated earlier herein, the underside 50 of lug 46b is slightly higher than the other lugs 46a and c-f because lug 46b defines a wider arc.

This concludes the description of the preferred embodiment. The reading of it by those skilled in the art will bring to mind many alterations and modifications without departing from the spirit and scope of the invention. Accordingly, it is intended that the scope of the invention be limited only by the appended claims.

What is claimed is:

1. A video terminal, comprising:
   an electronics unit having a top cover with a recess defining a spherically congruent seat;
   a CRT unit having an enclosure with a spherical segment protruding downwardly for resting on said seat to provide support for said CRT unit; and
   means for engaging said CRT unit to said electronics unit to prevent separation, said engaging means providing limited horizontal rotation of said spherical segment on said seat for swiveling said CRT unit, said engaging means providing limited vertical rotation of said spherical segment on said seat for tilting said CRT unit, said engaging means permitting separation of said CRT unit from said electronics unit by lifting said CRT unit upward in one unique horizontal rotational relationship of said CRT unit to said electronics unit.

2. The video terminal recited in claim 1 wherein said seat defines an annular band.

3. The video terminal recited in claim 1 wherein said recess further defines an annular trough into which a boss protruding from said spherical segment extends, said horizontal rotation of said spherical segment being limited by said boss contacting a stop in said trough.

4. The video terminal recited in claim 1 wherein said one horizontal rotational relationship is defined by the front of said CRT unit being 90° clockwise from the front of said electronics unit.

5. A disengageable joint between a stable base and a supported member providing limited movement of said supported member in two orthogonal planes, comprising:
   a concave recess in said stable base, said recess defining a bearing surface for a sphere;
   a cylindrical turret protruding from a bottom central region of said recess and rigidly attached thereto;
   said supported member having a downward protruding spherical segment adapted for seating on said bearing surface, said spherical segment having an oblong slot for receiving said turret during engagement of said joint wherein tilt and swivel of said supported member about said turret are provided; and
   means mounted within said spherical segment for engaging said turret to prevent separation of said supported member from said stable base except in a predetermined swivel alignment between said supported member and said stable base wherein said supported member can be raised and lowered for disengaging and engaging said joint.

6. The joint recited in claim 5 wherein said bearing surface defines an annular seat.

7. The joint recited in claim 6 wherein said recess further defines an annular trough with a stop and said spherical segment has a boss protruding into said trough, the arc of said swivel being limited by said boss contacting said stop.

8. The joint recited in claim 5 wherein tilt of said supported member is defined by lengthwise movement of said oblong slot about said turret.

9. A disengageable joint providing limited tilt and swivel of a CRT enclosure about a stable base on which it is supported, comprising:
   a concave upward facing recess in said base, said recess having a circular perimeter and defining a spherically congruent annular seat and an annular trough having a stop therein;
   said recess having a cylindrical turret extending vertically upward from the bottom center of said trough, said turret having a plurality of at least two pairs of opposing horizontal lugs extending therefrom;
   said CRT enclosure having a ball segment protruding from the underside thereof, said ball segment being adapted for resting on said annular seat, said ball segment having an oblong slot for receiving said turret during engagement of said joint, said slot having a width large enough for insertion over said lugs in a predetermined swivel alignment of said CRT enclosure to said turret wherein, after insertion, said CRT enclosure can be swiveled about said turret, said ball segment having a boss protruding into said trough to limit swivel in both directions by said boss contacting said stop, said CRT unit being tiltable by movement of said slot in the lengthwise direction about said turret; and
   means mounted within said ball segment for engaging said lugs except in said predetermined swivel alignment wherein, in that alignment, said joint is engageable and disengageable and, in all other alignments, said joint is nonengageable and, if already engaged, said CRT unit is inseparable from said stable base.

10. The joint recited in claim 9 wherein there are six lugs, at least two of which have different arcuate lengths.

11. The joint recited in claim 9 wherein said engaging means comprises two parallel arcuate flanges projecting beneath said lugs in all except said predetermined alignment of swivel.

12. A disengageable joint providing limited tilt and swivel of a CRT enclosure supported by a stable base, comprising:

a concave upward facing recess in said base, said recess having a circular entrance and defining a spherically congruent annular seat, said recess having a cylindrical turret extending vertically upward, said turret having a plurality of upwardly extending fingers having horizontal lugs protruding therefrom;

a ball segment protruding from the bottom of said CRT enclosure, said ball segment having an oblong slot;

a pair of parallel guide rails straddling said oblong slot on the inside of said ball segment and defining a channel therebetween;

an elongated cover slidably seated between said guide rails in said channel and covering said slot, said cover having an aperture with indentations conforming to said lugs for inserting said turret through said aperture;

means for retaining said cover within said channel, said retaining means having parallel arcuate flanges for engaging the underside of said lugs to prevent said CRT enclosure from separating from said base, said lugs of said turret being spaced around the circumference of said turret so that in a predetermined swivel alignment between said CRT unit and said stable base, said arcuate flanges are disengaged from said lugs permitting said CRT unit to be raised thereby separating said joint.

13. A disengageable joint for supporting an enclosure while providing limited movement of said enclosure in two orthogonal planes about a stable base, comprising:

a concave recess in said stable base, said recess defining a bearing surface for a sphere;

a cylindrical turret protruding upward from a central region of said recess;

said enclosure having a downward extending spherical segment adapted for seating on said bearing surface, said spherical segment having an oblong slot for receiving said turret thereby providing movement of said spherical segment in said two orthogonal planes;

a first electrical connector mounted within said turret;

a second electrical connector mounted within said spherical segment, said second electrical connector being adapted for mating with said first electrical connector in a predetermined alignment; and means for providing said predetermined alignment between said first and second electrical connectors when said slot is inserted down over said turret.

14. The joint recited in claim 13 wherein said bearing surface defines an annular spherically congruent seat.

15. The joint recited in claim 13 wherein said spherical segment is a truncated ball.

16. The joint recited in claim 13 wherein said second connector is suspended across said oblong slot by a circular connector mounting plate which is free to rotate with respect to said enclosure but is held in fixed alignment therewith after disengagement from said stable base.

17. A disengageable joint for supporting a CRT enclosure having limited movement in a horizontal and a vertical plane about a stable base, comprising:

a concave recess in said stable base, said recess having a circular entrance and defining an annular seat adapted for supporting a ball;

a cylindrical turret protruding vertically upward from the bottom central region of said recess;

said enclosure having a downwardly extending ball segment adapted for resting on said annular seat, said ball segment having an oblong slot adapted for receiving said turret during engagement of said joint thereafter providing tilt in a vertical plane and swivel in a horizontal plane of said enclosure about said stable base;

a first electrical connector mounted within said turret and facing upward;

a second electrical connector mounted within said ball segment and facing downward, said second electrical connector being adapted for mating with said first electrical connector in a predetermined rotational relationship; and means for preventing said turret from being inserted through said slot for engagement of said joint unless said enclosure is rotationally positioned above said stable base such that said second connector is in said predetermined rotational mating relationship with said first connector.

18. A disengageable joint for supporting an enclosure and providing tilt and swivel about a stable base, comprising:

a concave recess in said stable base, said recess having a substantially circular entrance and defining a spherically congruent annular seat, said recess having a cylindrical turret protruding from the bottom central region thereof, said turret having a plurality of upwardly extending fingers with lugs perpendicular thereto;

said enclosure having a downward extending ball segment adapted for resting on said annular seat, said ball segment having an oblong slot adapted for receiving said turret during engagement of said joint thereby providing tilt of said enclosure by movement of said slot in a lengthwise direction with respect to said turret which is stationary and swivel of said enclosure by rotation of said slot about said turret;

a first electrical connector rigidly mounted within said turret and facing upwards;

a second electrical connector mounted inside said ball segment and facing downward, said second electrical connector being adapted for mating with said first electrical connector in a predetermined rotational alignment;

means for preventing said turret from being inserted through said slot for engagement of said joint unless said enclosure is swivelly positioned above said turret such that said second connector is in said predetermined rotational alignment with said first connector; and means connected within said ball segment for engaging said lugs of said fingers when said enclosure is swiveled from said engagement position, said engaging means preventing disengagement of said joint except in said engagement position.

19. A support joint providing limited movement in a horizontal plane and a vertical plane, comprising:

a stable base having a concave recess defining a spherically congruent annular seat;

a cylindrical turret protruding vertically upward from the bottom central region of said concave recess, said turret having a plurality of vertical fingers spaced around the circumference thereof, said fingers having horizontal lugs;

an enclosure having a convex spherical segment protruding from the underside, said segment being adapted for resting on said annular spherically congruent seat, said segment having an oblong slot adapted for receiving said turret providing movement of said enclosure in two orthogonal planes with respect to said stable base;

means attached to said enclosure for engaging said horizontal lugs of said turret and preventing separation of said enclosure from said stable base unless said enclosure is in a predetermined unique rotational alignment with said stable base in said horizontal plane;

a first electrical connector mounted within said turret;

a second electrical connector mounted to said enclosure, said second electrical connector being adapted for mating with said first connector when said enclosure and said base are in said unique rotational alignment.

* * * * *